US012640390B2

(12) United States Patent
Chi et al.

(10) Patent No.: US 12,640,390 B2
(45) Date of Patent: May 26, 2026

(54) STRAP FOR BATTERY MODULE, BATTERY MODULE COMPRISING SAME, AND JIG FOR COMPRESSING STRAP

(71) Applicant: LG CHEM, LTD., Seoul (KR)

(72) Inventors: Ho-June Chi, Daejeon (KR);
Jung-Hoon Lee, Daejeon (KR);
Jeong-O Mun, Daejeon (KR);
Byoung-Cheon Jeong, Daejeon (KR)

(73) Assignee: LG ENERGY SOLUTION, LTD.,
Seoul (KR)

( * ) Notice: Subject to any disclaimer, the term of this patent is extended or adjusted under 35 U.S.C. 154(b) by 774 days.

(21) Appl. No.: 16/069,744

(22) PCT Filed: Jul. 31, 2017

(86) PCT No.: PCT/KR2017/008252
§ 371 (c)(1),
(2) Date: Jul. 12, 2018

(87) PCT Pub. No.: WO2018/043924
PCT Pub. Date: Mar. 8, 2018

(65) Prior Publication Data
US 2019/0020055 A1 Jan. 17, 2019

(30) Foreign Application Priority Data

Sep. 2, 2016 (KR) ........................ 10-2016-0113289

(51) Int. Cl.
*H01M 10/04* (2006.01)
*H01M 50/204* (2021.01)
*H01M 50/242* (2021.01)

(52) U.S. Cl.
CPC ..... *H01M 10/0481* (2013.01); *H01M 50/204* (2021.01); *H01M 50/242* (2021.01); *H01M 2220/20* (2013.01)

(58) Field of Classification Search
CPC ......... H01M 10/0468; H01M 10/0481; H01M 2/1077; H01M 50/204; H01M 50/242;
(Continued)

(56) References Cited

U.S. PATENT DOCUMENTS 4,020,244 A * 4/1977 Selinko ............... H01M 50/209
429/100
6,797,429 B1 9/2004 Komatsu
(Continued)

FOREIGN PATENT DOCUMENTS

CN 203948403 U 11/2014
CN 105583436 A 5/2016
(Continued)

OTHER PUBLICATIONS

Machine translation of Japanese Patent Publication No. H07-38709U, published Jul. 17, 1995. (Year: 1995).*
(Continued)

*Primary Examiner* — Miriam Stagg
*Assistant Examiner* — Lilia Nedialkova
(74) *Attorney, Agent, or Firm* — Birch, Stewart, Kolasch & Birch, LLP

(57) ABSTRACT

Disclosed is a strap, which compresses an outer surface of a battery module to prevent the battery module from being deformed by swelling of a battery cell, and the strap has a closed loop structure larger than an outer peripheral of the battery module, and at least a portion of the strap is folded at the closed loop to provide a welding portion at which the folded portions overlap each other when a predetermined compression is applied thereto.

4 Claims, 9 Drawing Sheets

(58) Field of Classification Search
CPC ... H01M 2220/20; B65D 71/02; B65D 45/18;
B65D 45/32; B65D 45/34; B65D 45/322;
Y02E 60/10; Y02P 70/50
See application file for complete search history.

(56) References Cited

U.S. PATENT DOCUMENTS

| | | | |
|---|---|---|---|
| 8,673,516 B2 | 3/2014 | Kim et al. | |
| 9,425,479 B2 | 8/2016 | Kim | |
| 2006/0093890 A1* | 5/2006 | Steinbroner | H01M 8/248 |
| | | | 429/511 |
| 2008/0237287 A1* | 10/2008 | Mitchinson | A45F 3/04 |
| | | | 224/645 |
| 2011/0123882 A1 | 5/2011 | Kim et al. | |
| 2011/0151312 A1* | 6/2011 | Kim | H01M 6/46 |
| | | | 429/156 |
| 2011/0259766 A1* | 10/2011 | Perl | B65D 75/02 |
| | | | 206/139 |
| 2014/0255818 A1 | 9/2014 | Chinnici et al. | |
| 2014/0295235 A1 | 10/2014 | Jung | |
| 2016/0141712 A1* | 5/2016 | Choi | H01M 50/227 |
| | | | 320/112 |

FOREIGN PATENT DOCUMENTS

| | | | |
|---|---|---|---|
| DE | 10 2008 059 966 A1 | | 6/2010 |
| JP | H0738709 U | * | 7/1995 |
| JP | 2000-285877 A | | 10/2000 |
| KR | 10-2011-0057848 A | | 6/2011 |
| KR | 10-2011-0072910 A | | 6/2011 |
| KR | 10-2014-0118734 A | | 10/2014 |
| KR | 10-2015-0000090 A | | 1/2015 |
| WO | WO 99/05743 A1 | | 2/1999 |
| WO | WO 2014/167019 A1 | | 10/2014 |

OTHER PUBLICATIONS

International Search Report (PCT/ISA/210) issued in PCT/KR2017/008252, mailed on Dec. 6, 2017.

* cited by examiner (a)

STRAP FOR BATTERY MODULE, BATTERY MODULE COMPRISING SAME, AND JIG FOR COMPRESSING STRAP

TECHNICAL FIELD

The present disclosure relates to a technique for manufacturing a battery module, and more particularly, to a strap for a battery module, a battery module including the strap, and a jig for compressing the strap.

The present application claims priority to Korean Patent Application No. 10-2016-0113289 filed on Sep. 2, 2016 in the Republic of Korea, the disclosures of which are incorporated herein by reference.

BACKGROUND ART

Recently, secondary batteries have been widely applied not only to portable devices but also to electric vehicles (EVs) or hybrid electric vehicles (HEVs) driven by electric driving sources.

Secondary batteries widely used at the present include lithium ion batteries, lithium polymer batteries, nickel cadmium batteries, nickel hydrogen batteries and nickel zinc batteries. The operating voltage of a unit secondary battery cell is about 2.5V to 4.2V. Therefore, if a higher output voltage is required, a plurality of secondary battery cells may be connected in series to form a battery module. In addition, depending on the charge/discharge capacity required for the battery module, a plurality of secondary battery cells may be connected in parallel to form a battery module.

When a battery pack is constructed by connecting a plurality of secondary battery cells in series and/or in parallel, in general cases, a cell assembly is firstly configured by stacking a plurality of secondary battery cells, an outer shape of the cell assembly is fixed, and an end plate for protecting the cell assembly against external impacts is added to construct a battery module.

Meanwhile, a plurality of secondary battery cells may be lithium-polymer pouch-type secondary batteries. In case of the lithium-polymer pouch-type secondary battery, an internal electrolyte is decomposed due to side reactions of repeated charge and discharge, which may generate gas. At this time, the outer shape of the secondary battery cell is deformed due to the generated gas, which is called a 'swelling phenomenon'.

If swelling occurs at the secondary battery cell included in the cell assembly, the outer shape of the battery module may be changed by an external force. The change of the outer shape may give an influence on the safety of the battery module and the stability of other adjacent devices. Thus, swelling should be prevented.

One of the swelling prevention techniques is to provide a steel strap around an end plate to compress the battery module with a constant force.

FIGS. 1a and 1b are simplified views showing a conventional strap for a battery module. First, the strap as shown in FIG. 1a is provided to surround the battery module and then both ends of the strap may be welded. For the full function of the strap, an outer surface of the battery module should be tightly fastened with a strap before welding. However, the strap of FIG. 1a may be easily released during the welding process, and thus it is difficult to secure a reliable compressing force for the battery module only by the welding force of the strap.

In addition, the strap as shown in FIG. 1b is advantageous in that the welding is not required and the structure is simple to ensure a low fabrication cost. However, the strap has a limited diameter, which makes it difficult to assemble with the battery module. Therefore, it is required to develop a new strap that may secure economic feasibility, easy assembling and sufficient binding force while possessing the advantages of the conventional strap.

DISCLOSURE

Technical Problem

The present disclosure is designed to solve the problems of the related art, and therefore the present disclosure is directed to providing a new strap for a battery module, which may secure easy mounting and sufficient binding force in comparison to a conventional strap, and a battery module including the strap.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a strap, which has a closed loop structure larger than an outer peripheral of the battery module, and at least a portion of the strap is folded at the closed loop to provide a welding portion at which the folded portions overlap each other when a predetermined compression is applied thereto.

The strap may include a first strap region, a second strap region, a third strap region and a fourth strap region, which are provided to surround a lower surface, a left surface, a right surface and an upper surface of the battery module, respectively, and the welding portion may be formed in the fourth strap region which surrounds the upper surface of the battery module.

The fourth strap region may further include a horizontal region extending horizontally with respect to the ground on the basis of the welding portion and an inclined region extending with a slope with respect to the ground.

The second strap region may be connected to the inclined region while forming an obtuse angle with respect to the first strap region.

The welding portion may be folded in a zigzag pattern.

In another aspect of the present disclosure, there is also provided a jig for compressing a strap to a battery module after providing the strap to surround the battery module, the jig comprising: a module accommodation space into which the battery module is partially fitted; and a pressing plate configured to form an upper wall of the module accommodation space, the pressing plate compressing folded portions of the strap when the battery module is inserted into the module accommodation space.

The jig for compressing a strap may further comprise: a support plate configured to form a lower wall of the module accommodation space and support the battery module; and an insertion limiting plate configured to vertically connect one edge of the pressing plate and one edge of the support plate to form one sidewall of the module accommodation space.

When a side of the battery module comes into contact with the insertion limiting plate, the pressing plate may extend shorter than a location of the welding portion of the strap.

The pressing plate may have a tapered end.

The pressing plate may be provided to be vertically movable so that the module accommodation space has an adjustable height.

The jig for compressing a strap may further comprise: a top plate provided above the pressing plate and having a screw hole vertically formed therethrough; and a height regulating member having a rod coupled into the screw hole of the top plate and a connection portion extending from the rod and connected to the pressing plate below the top plate.

In another aspect of the present disclosure, there is also provided a battery module, comprising: a cell assembly having a plurality of battery cells and a cell stacking frame; an end plate configured to cover the cell assembly; and a strap configured to surround the end plate.

At least two straps may be mounted at a predetermined interval along one side of the end plate.

Advantageous Effects

According to an embodiment of the present disclosure, it is possible to provide a new strap for a battery module, which may secure easy mounting and sufficient binding force in comparison to a conventional strap, and a battery module including the strap.

According to another embodiment of the present disclosure, it is possible to provide a jig for compressing a strap, which allows a strap compressing process and a welding process to be performed at once. Accordingly, it is possible to improve the reliability and convenience of the strap compressing process and the welding process.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 9 is a diagram showing that the strap is compressed to the strap compressing jig of FIG. 8.

BEST MODE

Figure 1:
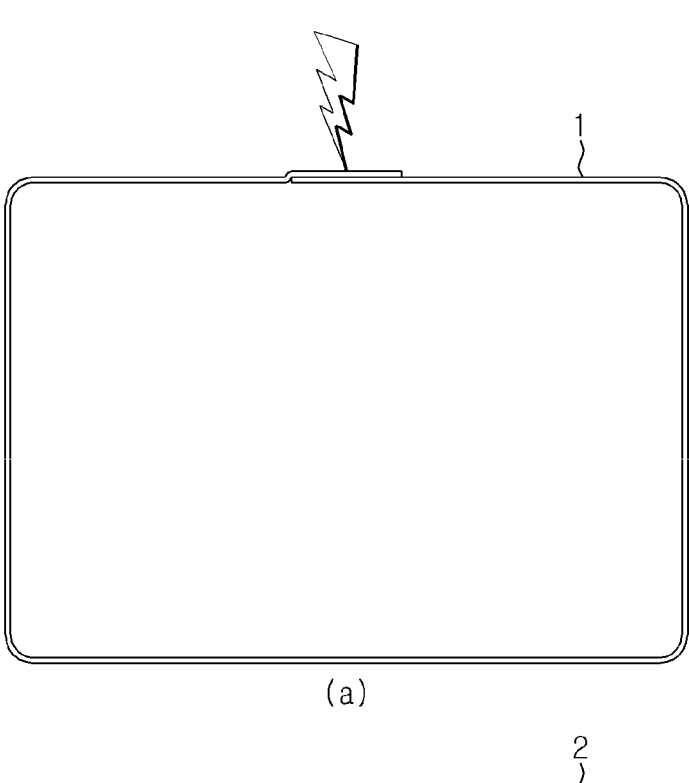
FIGS. 1a and 1b are schematic views showing a conventional strap.
Figure 1:
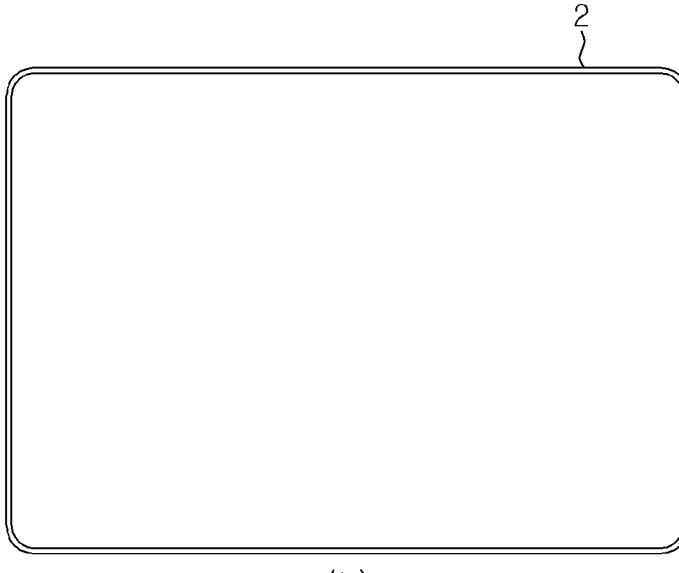

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Further, when describing the present disclosure, if it is determined that detailed explanation of relevant known features or functions may obscure the essence of the present disclosure, the detailed explanation is omitted.

Meanwhile, in the detailed description of the present disclosure and the claims, terms indicating directions such as up, down, left, right, side, and the like are relative terms for describing the directions as shown in the drawings, and these directions may be reversed depending on a viewing direction. In addition, shapes, sizes and the like of components in the drawings may be exaggerated, omitted, or schematically illustrated for clarity. Therefore, the size or proportion of each component does not completely reflect the actual size or proportion thereof.

Figure 2:
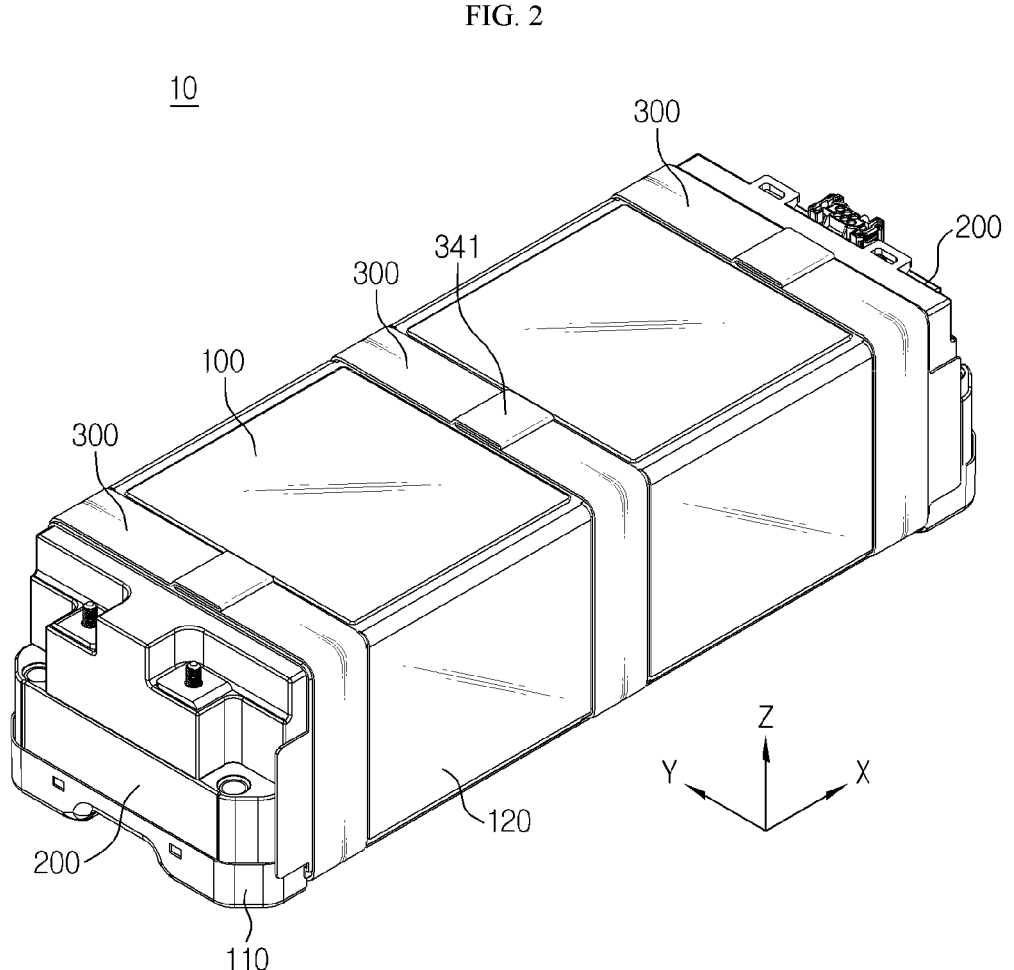
FIG. 2 is a perspective view schematically showing a battery module according to an embodiment of the present disclosure.

FIG. 2 is a perspective view schematically showing a battery module according to an embodiment of the present disclosure.

Referring to FIG. 2, a battery module 10 according to an embodiment of the present disclosure may include a cell assembly (not shown), a sensing assembly 200, an end plate 100 and a strap 300.

The cell assembly may be an aggregate of secondary batteries, which is composed of a plurality of secondary battery cells. Here, the kind of the secondary battery cell is not specially limited. Each secondary battery cell may be a lithium ion battery, a lithium polymer battery, a nickel cadmium battery, a nickel hydrogen battery, and a nickel zinc battery, which are rechargeable.

The cell assembly may further include a stacking frame for stacking secondary batteries. Here, the stacking frame is used for stacking secondary batteries, and the stacking frame may hold the secondary batteries to prevent the secondary batteries from moving and may also guide assembling of the secondary batteries. The stacking frame may also be called using another term such as a cartridge.

The sensing assembly 200 plays a role of transmitting sensing information about electrical characteristics, such as voltage of the secondary battery cells, to other devices out of the battery module 10. For example, a device such as a battery management system (BMS) may be connected to the battery module 10 to control the operation of the battery module 10, such as charging or discharging. At this time, the sensing assembly 200 may be connected to the BMS to provide voltage information of the secondary battery cells to the BMS, and the BMS may control the battery module 10 based on the information.

The sensing assembly 200 may be mounted to one side or both sides of the cell assembly to be electrically connected to the electrode leads of the secondary battery cells.

The battery module 10 of this embodiment is configured using pouch-type secondary battery cells in which a positive electrode lead and a negative electrode lead extend in both directions, and thus, as shown in FIG. 2, the sensing assembly 200 is mounted on both sides of the cell assembly, respectively.

The end plate 100 may include a base plate 110 positioned at a lower surface of the cell assembly and a cover plate 120 coupled to the base plate 110 by welding or bolt fastening. The cover plate 120 may be formed in a substantially "[" shape to cover an upper surface and both sides of the cell assembly. However, the present disclosure is not limited to the end plate 100 as in this embodiment. Unlike this embodiment, the end plate can be manufactured in various ways such as assembling four plates or molding them integrally.

The end plate 100 provides mechanical support for the cell assembly and protects the cell assembly inside the battery module 10 from external impacts. The end plate 100 may be made of a metal material to secure rigidity. In particular, the end plate 100 may be made of steel to ensure rigidity in preparation for swelling of the secondary battery cells.

As shown in FIG. 2, the outer surface of the battery module 10 may be formed by the end plate 100, and the end plate 100 may be reinforced by being surrounded by a strap 300 of a band shape. The strap 300 serves to prevent deformation of the battery module 10 caused by cell swelling by pressing the outer surface of the battery module 10, namely the end plate 100.

Figure 3:
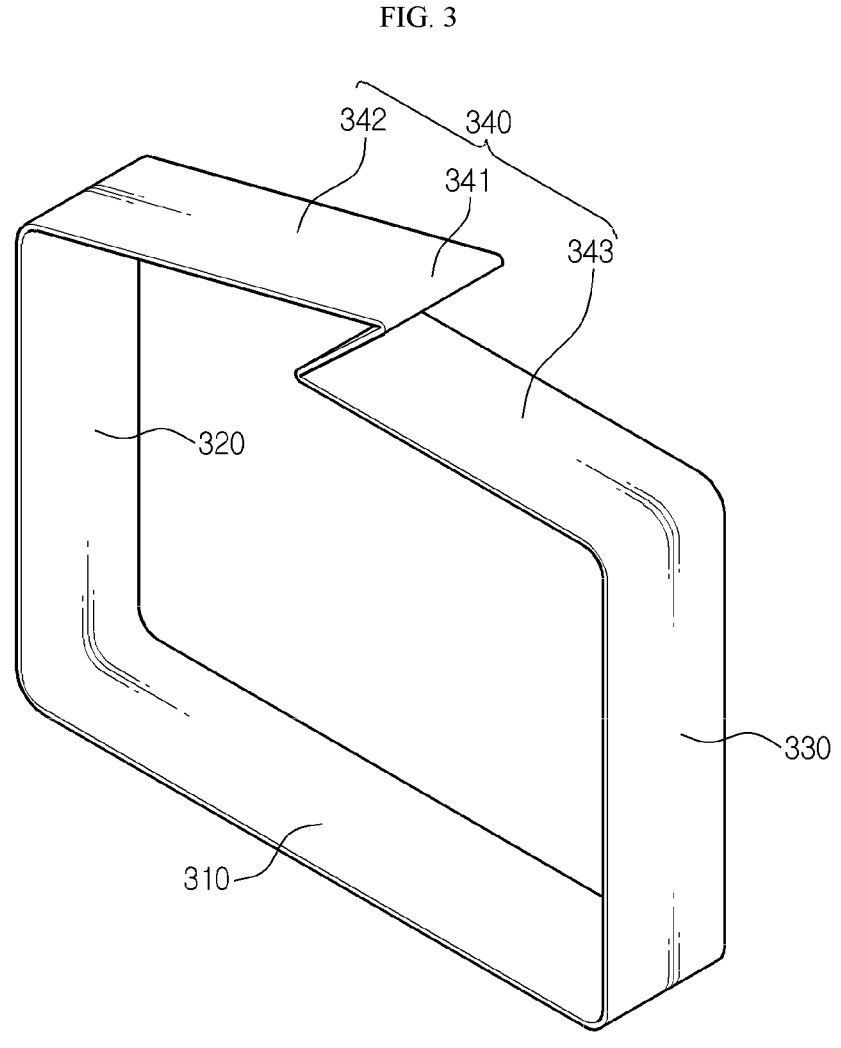
FIG. 3 is a perspective view showing a strap according to an embodiment of the present disclosure.
Figure 4:
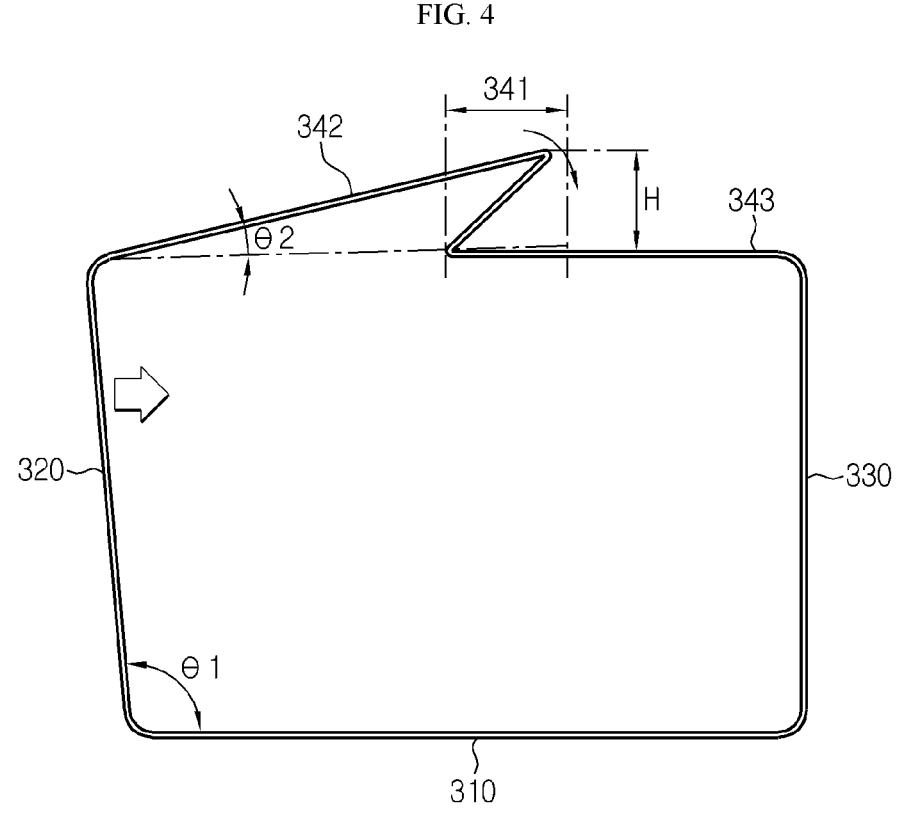
FIG. 4 is a cross-sectioned view of FIG. 3.

FIG. 3 is a perspective view showing a strap according to an embodiment of the present disclosure, and FIG. 4 is a cross-sectioned view of FIG. 3.

According to an embodiment of the present disclosure, the strap 300 has a closed loop structure larger than the outer periphery of the battery module 10, and at least a portion of the closed loop may be folded. The strap 300 may be made of a metal material such as steel so as to function as an intensifying member.

For example, a worker may mount the strap 300 to the battery module 10 such that the strap 300 surrounds the battery module 10 in a longitudinal direction (an X-axis direction in FIG. 2). At this time, since the strap 300 has a slight elasticity and has a closed loop structure with a larger circumference than the circumference of the battery module 10, the strap 300 may be assembled with the battery module 10 more easily. Meanwhile, the end plate 100 may further include a groove for mounting the strap 300 at a position where the strap 300 is to be mounted. The grooves may be concave than other surfaces of the end plate 100. Thus, if the strap 300 is placed in the groove, it is possible to prevent the strap 300 from moving left and right.

As shown in FIGS. 3 to 4, the strap 300 may include a first strap region 310, a second strap region 320, a third strap region 330 and a fourth strap region 340, which are respectively provided to surround the lower surface, the left surface, the right surface and the upper surface of the battery module 10 to which the strap 300 is to be mounted.

In this embodiment, the battery module 10 may have a substantially box-like outer shape, and its periphery may be rectangular. The first strap region 310 may be provided to have a length corresponding to the width of the base plate 110 which serves as the lower surface of the battery module 10, and the second and third strap regions 330 may be provided to have a length corresponding to the widths of the left surface and the right surface of the cover plate, which serves as the left surface and the right surface of the battery module 10. In other words, the first to third strap regions 330 may be provided to have substantially the same width and length as the corresponding portion of the end plate 100.

The fourth strap region 340 is made longer than the width of the upper surface of the battery module 10 and has a welding portion 341 at which at least a portion thereof is folded into a zigzag pattern. The welding portion 341 folded up and down on the drawing may be compressed and then welded. In addition, in FIG. 4, the fourth strap region 340 may further include a horizontal region 343 located to the right of the welding portion 341 and horizontal to the ground, and an inclined region 342 located to the left of the welding portion 341 and having a slope with respect to the ground. Here, the second strap region 320 may be connected to the inclined region 342 while forming an obtuse angle θ1 with respect to the first strap region 310.

As described above, the second strap region 320 and the fourth strap region 340 are partially extended outwardly from the periphery of the battery module 10 to which the strap is to be attached, so that the strap 300 may be elastically expanded to be easily provided around the battery module 10.

Since the horizontal region 343 of the fourth strap region 340 is inclined approximately at a right angle to the third strap region 330, the horizontal region 343 and the third strap region 330 may come into contact with the upper portion of the battery module 10 if the strap 300 surrounds the battery module 10. In addition, the first strap region 310 may come into contact with the lower surface of the battery module 10.

Meanwhile, the inclined region 342 has a slope θ2 with respect to the horizontal region 343 as much as the height H of the welding portion 341. This slope may converge to almost "zero degree" if the inclined region 342 is compressed at the top of the fourth strap region 340. For example, if the strap 300 is provided to surround the battery module 10 and then the inclined region 342 of the fourth strap region 340 is pressed, the slope θ2 of the inclined region 342 may be approximately 0 degrees and come into contact with the upper surface of the battery module 10. Also, since the second strap region 320 is deformed integrally with the inclined region 342, the second strap region 320 may come into contact with the left surface of the battery module 10 as the angle θ1 is decreased.

In other words, if a certain pressing force is applied after the strap 300 is provided to surround the battery module 10, the shape of the strap 300 of the present disclosure may be deformed to fit the periphery of the battery module 10.

Meanwhile, the strap 300 described above may be manually provided to surround the battery module 10 and compressed, and then the welding process may be performed. However, the manual operation may deteriorate the efficiency of the compressing process, and further, the pressing process and the welding process should be performed separately.

Hereinafter, a jig 20 for compressing a strap (hereinafter, also referred to as a strap compressing jig 20) according to the present disclosure, which enables the strap 300 to perform the compressing process and the welding process at once, will be described.

Figure 5:
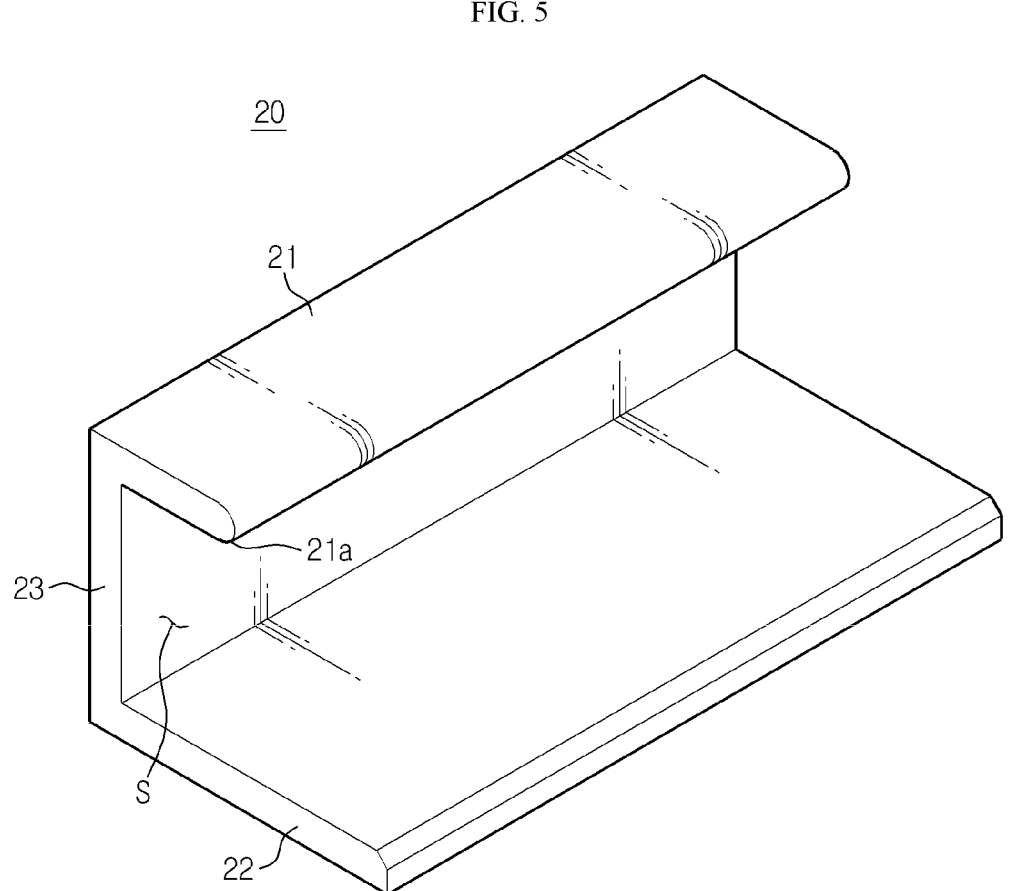
FIG. 5 is a perspective view schematically showing a jig for compressing a strap according to an embodiment of the present disclosure.
Figure 6:
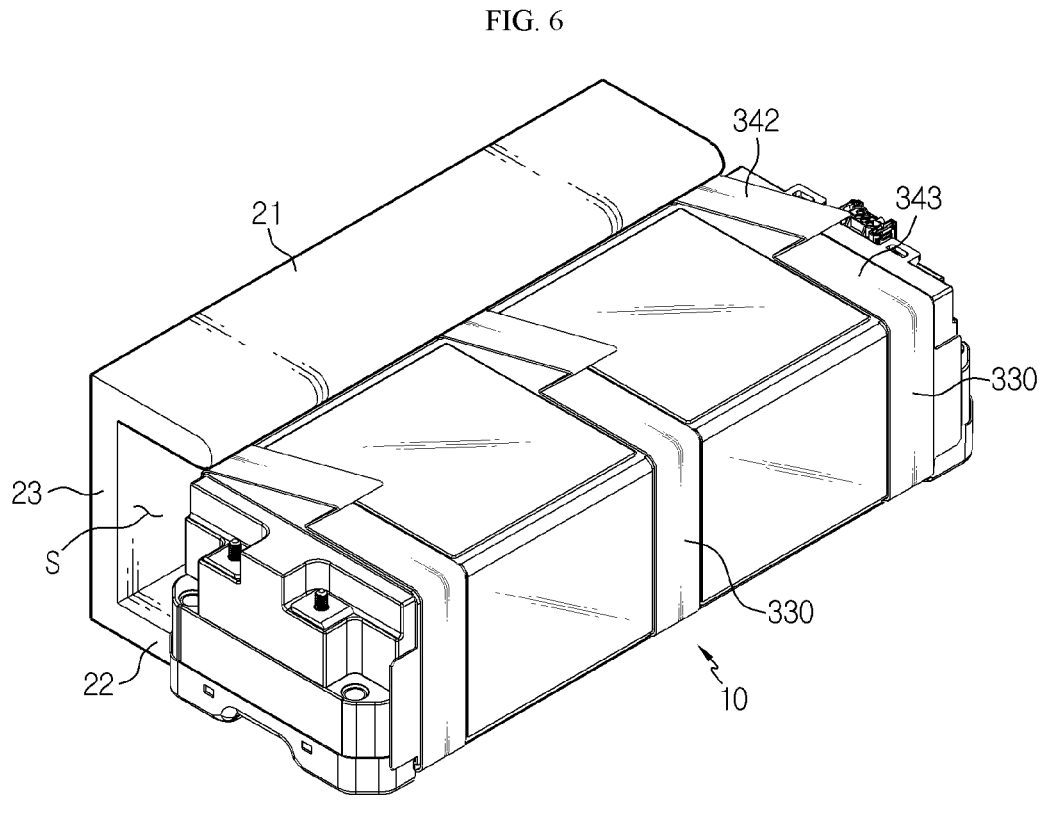
FIG. 6 is a perspective view showing that the battery module is partially inserted into the strap compressing jig of FIG. 5.

FIG. 5 is a perspective view schematically showing a jig for compressing a strap according to an embodiment of the present disclosure, and FIG. 6 is a perspective view showing that the battery module is partially inserted into the strap compressing jig of FIG. 5.

Referring to FIGS. 5 and 6, the strap compressing jig 20 according to the present disclosure may include a pressing plate 21, a support plate 22, an insertion limiting plate 23 and a module accommodation space S formed by them.

The strap compressing jig 20 according to this embodiment may be formed in a substantially "[" shape and be configured to push the battery module 10 into the module accommodation space S through an open portion. Here, the pressing plate 21, the support plate 22 and the insertion limiting plate 23 may be portions forming an upper wall, a lower wall and a sidewall of the module accommodation space S, respectively.

The length of the pressing plate 21 may be approximately determined according to the length of the inclined region 342 of the strap 300. For example, when the battery module 10 is fully pushed into the module accommodation space S, an end 21*a* of the pressing plate 21 should sufficiently press the inclined region 342, but should not come into contact with the welding portion 341 of the strap 300 which is a welding target.

The end 21*a* of the pressing plate 21 may be provided in a tapered shape or a rounded shape whose diameter is gradually reduced. This softens the contact between the end plate 21*a* of the pressing plate and the inclined region 342, thereby making it possible to prevent the strap 300 from being damaged.

The support plate 22 may be formed to be relatively larger than the pressing plate 21. The support plate 22 may serve as a shelf that fully supports the lower surface of the battery module 10.

The insertion limiting plate 23 may limit an insertion depth of the battery module 10. The height of the insertion limiting plate 23 may correspond to the height of the battery module 10.

Figure 7A:
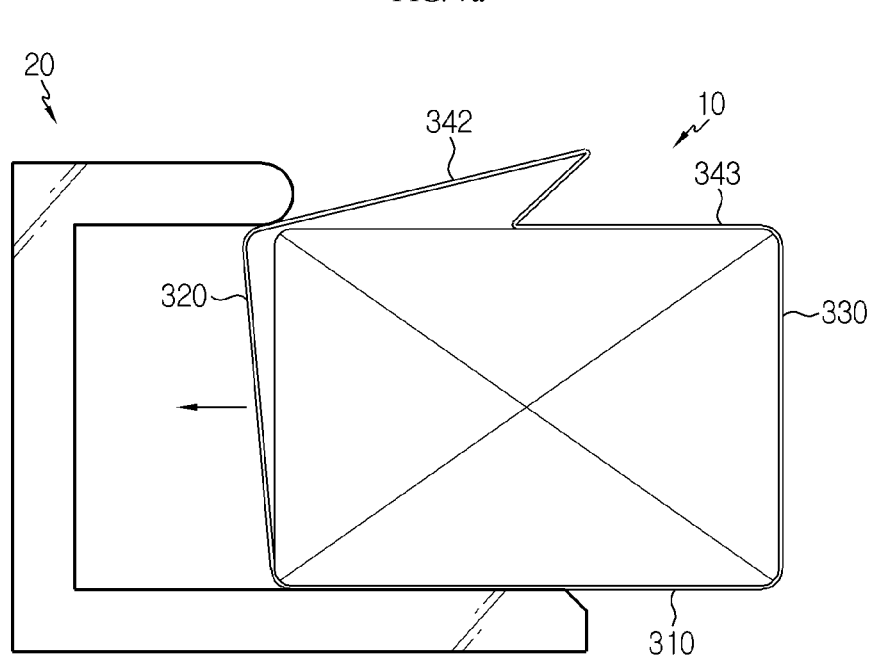
FIGS. 7a and 7b are diagrams for illustrating a method for compressing a strap by using the strap compressing jig of FIG. 5.

Hereinafter, referring to FIGS. 7*a* and 7*b*, the compression process for the strap 300 and the welding process using the strap compressing jig 20 according to the present embodiment will be briefly described.

First, the battery module 10 surrounded by the strap 300 of the present disclosure as described above is prepared and placed on a support 22 of the strap compressing jig 20.

Then, the battery module 10 is slowly pushed into the module accommodation space S. Accordingly, the inclined region 342 of the strap 300 may be compressed onto the upper surface of the battery module 10 by the pressing plate 21. Finally, if the battery module 10 is fitted into the module accommodation space S, the second strap region 320 and the inclined region 342 may be completely compressed into the battery module 10.

Figure 7B:
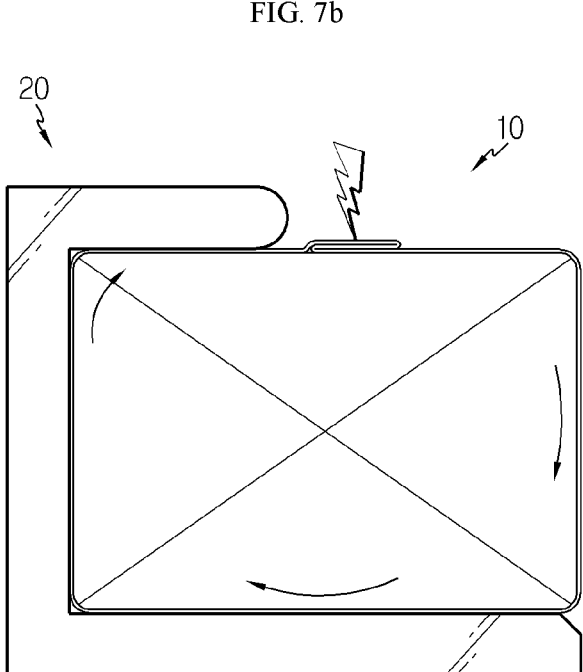

If the strap 300 is fully compressed to the battery module 10 as described above, the strap 300 applies a fastening force as indicated by the arrow of FIG. 7*b*, and thus the battery module 10 may be tightly fastened by the strap 300.

After that, the welding portion 341 of the strap 300 is welded in a state where the battery module 10 is constrained to the strap compressing jig 20. If the welding process is performed as described above, welding may be performed in an environment in which the strap 300 is kept in a tight state, so that the compressing force of the strap 300 against the battery module 10 may be sufficiently secured even after the welding. In addition, since the battery module 10 is constrained to the strap compressing jig 20, the welding process may be performed stably without using a separate jig for welding the battery module.

Another embodiment of the present disclosure will be described below, and the configuration of this embodiment corresponds to FIGS. 5 and 6. Like members will be denoted by like reference numerals, and repeated descriptions will be omitted.

Figure 8:
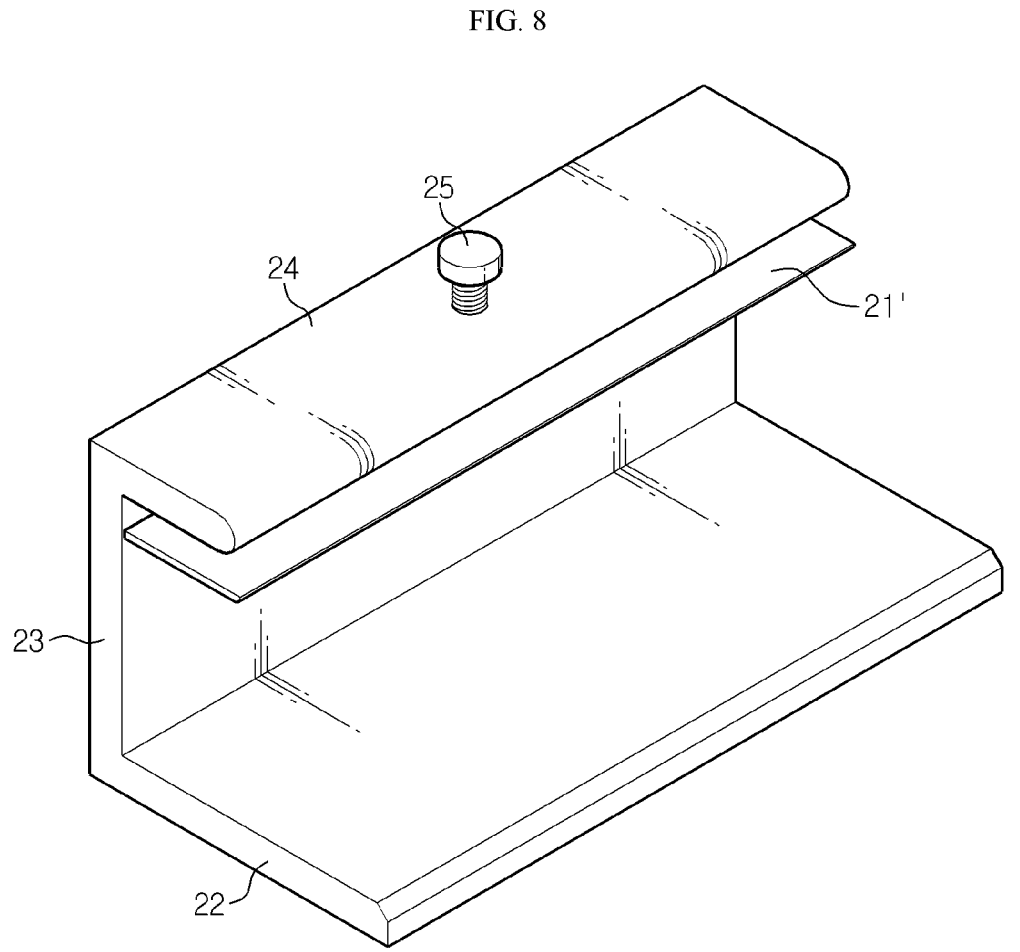
FIG. 8 is a perspective view schematically showing a jig for compressing a strap according to another embodiment of the present disclosure.
Figure 9:
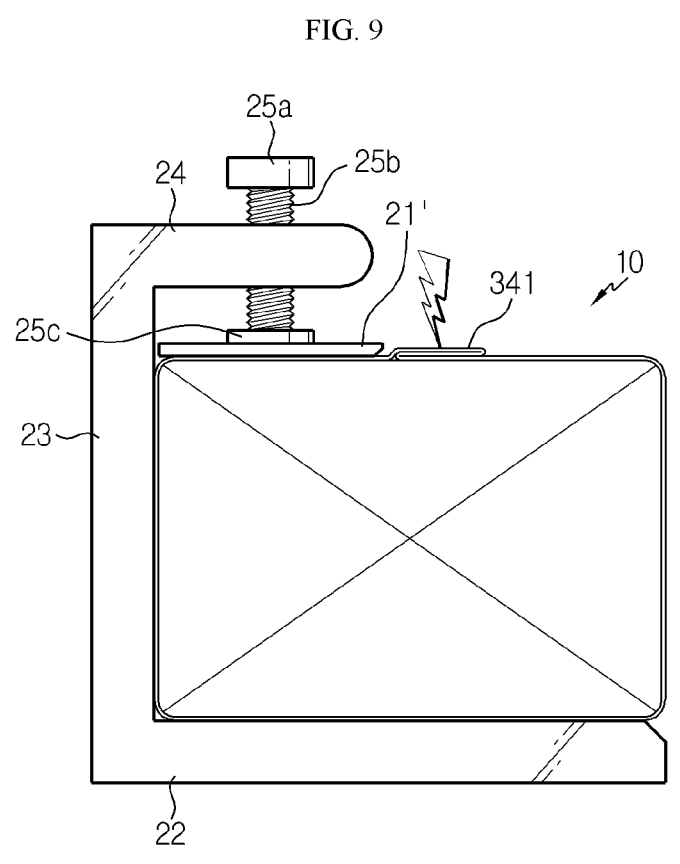

FIG. 8 is a perspective view schematically showing a jig for compressing a strap according to another embodiment of the present disclosure, and FIG. 9 is a diagram showing that the strap is compressed to the strap compressing jig of FIG. 8.

As shown in FIG. 8, the strap compressing jig 20 of this embodiment includes a top plate 24 provided above the pressing plate 21 and having a screw hole vertically formed therethrough, and a height regulating member 25 mounted to the screw hole to be movable relative to the top plate 24. The height regulating member 25 may include a handle 25*a*, a rod 25*b* coupled into the screw hole, and a connection portion 25*c* extending from the rod 25*b* to the lower portion of the top plate 24 and connected to the pressing plate 21. In this configuration, the pressing plate 21 may move up and down according to the rotation direction of the height regulating member 25.

An example for using the strap compressing jig 20 will be briefly described.

First, the battery module 10 surrounded by the strap 300 is prepared. Then, the battery module 10 is placed inside the module accommodation space S so as to be closely adhered to the insertion limiting plate 23. At this time, it is preferable to release the handle 25*a* of the height regulating member 25 to sufficiently move the pressing plate 21 upwards. After that, the handle 25*a* of the height regulating member 25 is turned until the welding portions 341 of the strap 300 are fully overlapped, so that the inclined region 342 is compressed to the upper surface of the battery module 10 by means of the pressing plate 21. Next, it is checked that the battery module 10 is firmly fixed between the pressing plate 21 and the support plate 22, and then the strap 300 is welded.

If the strap compressing jig 20 according to the present embodiment in which the module accommodation space S has an adjustable height is used, the strap 300 of the battery module 10 may be compressed and welded even though the battery module 10 has different sizes.

Heretofore, although preferred embodiments of the present disclosure have been described, it should be understood that the present disclosure is not limited to the specific preferred embodiments described above, and that various modified examples and changes can be made by those skilled in the art without departing from the scope of the disclosure.

As used herein, terms indicating directions such as "up", "down", "left", "right", and the like are only for convenience of description, and it will be obvious to those skilled in the art that these terms may be expressed differently depending upon viewing positions of an observer, positions of an object, or the like.

What is claimed is:

1. A battery module, comprising:
   a cell assembly having a plurality of battery cells and a cell stacking frame;
   an end plate configured to encircle the cell assembly, the end plate having a tubular shape with four wall portions and two open ends;
   at least three metal straps surrounding the end plate, each strap being a single-body, integrally formed endless closed loop structure that is larger than an outer peripheral of the battery module, each strap including a first strap region, a second strap region, a third strap region and a fourth strap region, which are provided to surround a lower surface, a left surface, a right surface and an upper surface of the battery module, respectively; and
   two sensing assemblies located at the two open ends of the end plate,
   wherein the end plate includes at least three grooves corresponding to the at least three metal straps, the at least three grooves including a centrally located groove and two grooves located at the two open ends of the end plate, wherein, prior to welding, a maximum length of the first strap region is less than a maximum length of the fourth strap region, wherein at least a portion of each strap is folded in the fourth region to provide a welding portion at which folded portions overlap such that outer surfaces of each strap at the welding portion directly contact each other when a predetermined compression is applied thereto, wherein, prior to folding the at least the portion of each strap, the fourth strap region further includes a horizontal region extending horizontally with respect to a ground on the basis of the welding portion and an inclined region extending with a slope with respect to the ground, wherein the welding portion is welded, wherein, when the inclined region is pressed, the second strap region is deformed integrally with the inclined region, wherein, prior to folding the at least the portion of each strap, the second strap region is connected to the inclined region while forming an obtuse angle with respect to the ground, and the third strap region is perpendicular with respect to the ground, and wherein none of the at least three metal straps extend across the two open ends of the end plate.

2. The battery module according to claim 1, wherein the welding portion is folded in a zigzag pattern.

3. The battery module according to claim 1, wherein the folded portions for each strap overlap in a vertical direction relative to the ground.

4. The battery module according to claim 1, wherein the end plate includes a base plate and a cover plate having a u-shape.

* * * * *